(12) United States Patent
Hwang et al.

(10) Patent No.: US 11,828,694 B2
(45) Date of Patent: Nov. 28, 2023

(54) APPARATUS FOR REAL-TIME CONTINUOUS MEASUREMENT OF AIRBORNE MICROORGANISMS

(71) Applicant: INDUSTRY-ACADEMIC COOPERATION FOUNDATION, YONSEI UNIVERSITY, Seoul (KR)

(72) Inventors: Jung Ho Hwang, Seoul (KR); Jang Seop Han, Seoul (KR); Hyeong Rae Kim, Seoul (KR); Sang Gwon An, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 378 days.

(21) Appl. No.: 17/267,598

(22) PCT Filed: Aug. 8, 2019

(86) PCT No.: PCT/KR2019/009981
§ 371 (c)(1),
(2) Date: Feb. 10, 2021

(87) PCT Pub. No.: WO2020/032625
PCT Pub. Date: Feb. 13, 2020

(65) Prior Publication Data
US 2021/0310927 A1    Oct. 7, 2021

(30) Foreign Application Priority Data
Aug. 10, 2018   (KR) .................. 10-2018-0093711

(51) Int. Cl.
*G01N 15/06* (2006.01)
*G01N 15/14* (2006.01)
*G01N 15/10* (2006.01)

(52) U.S. Cl.
CPC .......... *G01N 15/06* (2013.01); *G01N 15/147* (2013.01); *G01N 2015/0693* (2013.01); *G01N 2015/1006* (2013.01); *G01N 2015/1477* (2013.01)

(58) Field of Classification Search
CPC .............. G01N 15/06; G01N 15/147; G01N 2015/0693; G01N 2015/1006; G01N 2015/1477
(Continued)

(56) References Cited

U.S. PATENT DOCUMENTS 6,344,361 B1 *  2/2002  Lehman .............. B01D 1/0082
                                                        203/40
2006/0238757 A1   10/2006  Silcott
(Continued)

FOREIGN PATENT DOCUMENTS

CN    115698484 A  *  2/2023  ............ B64D 37/04
JP       7174205 B1 *  11/2022
(Continued)

OTHER PUBLICATIONS

NOA of Korean Application No. 10-2018-0093711 dated Nov. 15, 2019.
(Continued)

*Primary Examiner* — Max H Noori
(74) *Attorney, Agent, or Firm* — Sughrue Mion, PLLC

(57) ABSTRACT

The present invention relates to an apparatus for real-time continuous measurement of airborne microorganisms including a body unit, a vaporization unit, a liquefaction unit, a coating unit, and a measurement unit. The body unit has an inlet through which airborne microorganisms are introduced and an outlet through which airborne microorganisms are discharged. The vaporization unit vaporizes a lysis solution and supplies the v inside of the body unit. The liquefaction unit cools the vaporized lysis solution to condense the vaporized lysis solution on the surfaces of the airborne microorganisms. The coating unit applies a light-emitting agent onto the airborne microorganisms lysed by the lysis solution. The measurement unit detects the intensity of light generated by reacting the airborne microorganisms and the light-emitting agent and measures the concentration of the airborne microorganisms.

19 Claims, 2 Drawing Sheets

(58) Field of Classification Search
USPC ........................................................ 73/61.71
See application file for complete search history.

(56) References Cited

U.S. PATENT DOCUMENTS

2014/0349280 A1* 11/2014 Raymond ........ G01N 33/54326
435/7.1

2015/0143806 A1* 5/2015 Friesth .................... F01K 13/02
220/592.2
2023/0211406 A1* 7/2023 Burkholder ............ B22D 27/04
148/577

FOREIGN PATENT DOCUMENTS

| KR | 10-2012-0086384 A | 8/2012 | |
|---|---|---|---|
| KR | 10-1508146 B1 | 4/2015 | |
| KR | 10-2015-0101648 A | 9/2015 | |
| KR | 10-2017-0097887 A | 8/2017 | |
| KR | 20190030146 A * | 3/2019 | |
| WO | 2013/132630 A1 | 9/2013 | |
| WO | WO-2013148162 A1 * | 10/2013 | ............... C12Q 1/04 |

OTHER PUBLICATIONS

International Search Report of PCT/KR2019/009981 dated Nov. 11, 2019 [PCT/ISA/210].
Written Opinion of PCT/KR2019/009981 dated Nov. 11, 2019 [PCT/ISA/237].

* cited by examiner

APPARATUS FOR REAL-TIME CONTINUOUS MEASUREMENT OF AIRBORNE MICROORGANISMS

CROSS REFERENCE TO RELATED APPLICATIONS

This application is a National Stage Entry of PCT International Application No. PCT/KR2019/009981, which was filed on Aug. 8, 2019, and claims priority to Korean Patent Application No. 10-2018-0093711, filed on Aug. 10, 2018 in the Korean Intellectual Property Office, the disclosure of which is incorporated herein by reference.

TECHNICAL FIELD

The present invention relates to an apparatus for real-time continuous measurement of airborne microorganisms capable of continuously measuring the concentration of airborne microorganisms moving in a gas phase in real time. More particularly, the present invention relates to an apparatus for real-time continuous measurement of airborne microorganisms capable of measuring the concentration of a biological aerosol without collecting the biological aerosol by performing a series of processes including ATP extraction, bioluminescence, and concentration measurement for the biological aerosol moving in a gas phase.

BACKGROUND ART

Recently, as avian influenza and novel swine-origin influenza A have appeared, interest in airborne infection is increasing. Accordingly, the market related to biosensors for measuring airborne microorganisms is rapidly growing.

Examples of methods of measuring airborne microorganisms include a culture method of collecting biological particles suspended in a gas sample on the surface of a solid or liquid medium suitable for growth, incubating the biological particles under an appropriate temperature and humidity for a period of time, and calculating the number of collected microorganisms based on the number of colonies formed on the surface and a staining method of measuring the number of microorganisms using staining and a fluorescence microscope.

Recently, an ATP bioluminescence method that uses the principle that light is generated when adenosine triphosphate (ATP) and luciferin/luciferase react has been developed. According to this method, a series of processes of ATP erasure treatment, ATP extraction, and measurement of the amount of light emission is performed. These processes take about 30 minutes, and thus rapid measurement is possible.

However, when the above methods are used, real-time measurement of airborne microorganisms is impossible. In addition, the above methods have limitations in that a separate sampling process, a pre-processing process, and the like are manually performed. That is, in the case of conventional biosensors, since a separate sampling process is required when measuring airborne microorganisms, an excessive measurement time (20 minutes to 2 hours) is required.

To solve these problems, an apparatus, such as a UV-APS (TSI Co., USA), capable of measuring microorganisms without a separate sampling process has been developed. However, the apparatus is very expensive, and thus commercialization of the apparatus is difficult.

DISCLOSURE

Technical Problem

Therefore, the present invention has been made in view of the above problems, and it is one object of the present invention to provide an apparatus for real-time continuous measurement of airborne microorganisms capable of measuring airborne microorganisms without expensive equipment by automatically supplying a lysis solution and an ATP reactive light-emitting agent to airborne microorganisms.

It is another object of the present invention to provide an apparatus for real-time continuous measurement of airborne microorganisms capable of increasing ATP extraction rate and reducing time required to measure the concentration of airborne microorganisms by increasing the contact area between a lysis solution for destroying the cell walls of airborne microorganisms and airborne microorganisms by vaporizing the lysis solution to discharge the lysis solution in a vapor phase and then cooling the lysis solution to condense the lysis solution on the surfaces of the airborne microorganisms.

Technical Solution

In accordance with one aspect of the present invention, provided is an apparatus for real-time continuous measurement of airborne microorganisms including a body unit, a vaporization unit, a liquefaction unit, a coating unit, and a measurement unit. The body unit has an inlet through which airborne microorganisms are introduced and an outlet through which airborne microorganisms are discharged. The vaporization unit vaporizes a lysis solution and supplies the vaporized lysis solution to an inside of the body unit. The liquefaction unit cools the vaporized lysis solution to condense the vaporized lysis solution on surfaces of the airborne microorganisms. The coating unit applies a light-emitting agent onto the airborne microorganisms lysed by the lysis solution. The measurement unit detects an intensity of light generated by reacting the airborne microorganisms and the light-emitting agent and measures a concentration of the airborne microorganisms.

According to one embodiment, the lysis solution may include a lysis buffer for extracting adenosine triphosphate (ATP) by lysing cells of the airborne microorganisms.

According to one embodiment, the lysis buffer may include an alcohol.

According to one embodiment, the light-emitting agent may include a luciferin and a luciferase.

According to one embodiment, the light-emitting agent may further include magnesium ions ($Mg^{2+}$).

According to one embodiment, the measurement unit may include a photomultiplier tube (PMT) sensor.

According to one embodiment, a concentrating unit for concentrating the airborne microorganisms to reduce a volume of the airborne microorganisms may be installed between the coating unit and the measurement unit.

According to one embodiment, the concentrating unit may include an aerodynamic lens.

According to one embodiment, the concentrating unit may be provided by forming the body unit so that a diameter of the body unit is reduced stepwise.

According to one embodiment, a suction pump for controlling movement of the airborne microorganisms may be installed at the outlet of the body unit.

In accordance with another aspect of the present invention, provided is an apparatus for real-time continuous measurement of airborne microorganisms including a body unit, a vaporization unit, a liquefaction unit, a coating unit, a concentrating unit, and a measurement unit. The body unit has an inlet through which airborne microorganisms are introduced and an outlet through which airborne microorganisms are discharged. The vaporization unit vaporizes a lysis solution and supplies the vaporized lysis solution to an inside of the body unit. The liquefaction unit cools the vaporized lysis solution to condense the vaporized lysis solution on surfaces of the airborne microorganisms. The coating unit applies an ATP reactive light-emitting agent onto the airborne microorganisms lysed by the lysis solution. The concentrating unit concentrates the airborne microorganisms coated with the ATP reactive light-emitting agent to reduce a volume of the airborne microorganisms. The measurement unit detects an intensity of light generated by reacting the concentrated airborne microorganisms and the ATP reactive light-emitting agent and measures a concentration of the airborne microorganisms.

According to one embodiment, the lysis solution may include a lysis buffer for extracting adenosine triphosphate (ATP) by lysing cells of the airborne microorganisms.

According to one embodiment, the lysis buffer may include an alcohol.

According to one embodiment, the ATP reactive light-emitting agent may include a luciferin and a luciferase.

According to one embodiment, the ATP reactive light-emitting agent may further include magnesium ions ($Mg^{2+}$).

According to one embodiment, the measurement unit may include a photomultiplier tube (PMT) sensor.

According to one embodiment, the concentrating unit may include an aerodynamic lens.

According to one embodiment, the concentrating unit may be provided by forming the body unit so that a diameter of the body unit is reduced stepwise.

According to one embodiment, a suction pump for controlling movement of the airborne microorganisms may be installed at the outlet of the body unit.

Advantageous Effects

According to the present invention, since sampling of airborne microorganisms, ATP extraction, bioluminescence, and concentration measurement are performed in series, real-time continuous measurement of airborne microorganisms is possible.

In addition, since airborne microorganisms moving in a gas phase are measured, a separate collection device for collecting airborne microorganisms is not required, and thus wastewater is not generated from the collection device, thereby preventing environmental pollution.

In addition, since airborne microorganisms are not collected by a collection device, there is no measurement error due to contamination of the collection device.

In addition, since a series of processes from sampling of airborne microorganisms to measurement of airborne microorganisms is performed continuously, no extra time is required to collect and concentrate airborne microorganisms, thereby reducing measurement time.

In addition, by vaporizing a lysis solution for destroying the cell walls of airborne microorganisms to discharge the lysis solution in a vapor phase and then cooling the lysis solution to condense the lysis solution on the surfaces of airborne microorganisms, the contact area between the lysis solution and the airborne microorganisms can be increased. Accordingly, the rate of lysing the airborne microorganisms can be increased, thereby increasing the ATP extraction rate at which light is emitted by reaction with a light-emitting agent. Thus, time required to measure the concentration of airborne microorganisms can be reduced.

In addition, as a lysis solution is condensed on the surfaces of airborne microorganisms, the surface area of the airborne microorganisms increases. Accordingly, adhesion of a light-emitting agent to the surfaces of the airborne microorganisms can be promoted, thereby increasing measurement accuracy.

In addition, a concentrating unit is installed between a coating unit and a measurement unit to reduce the volume of airborne microorganisms stepwise and to discharge the airborne microorganisms in a row by forming a laminar flow. Thus, during measurement, overlapping of the airborne microorganisms can be prevented, thereby increasing accuracy when measuring the concentration of the airborne microorganisms.

BEST MODE

Figure 1:
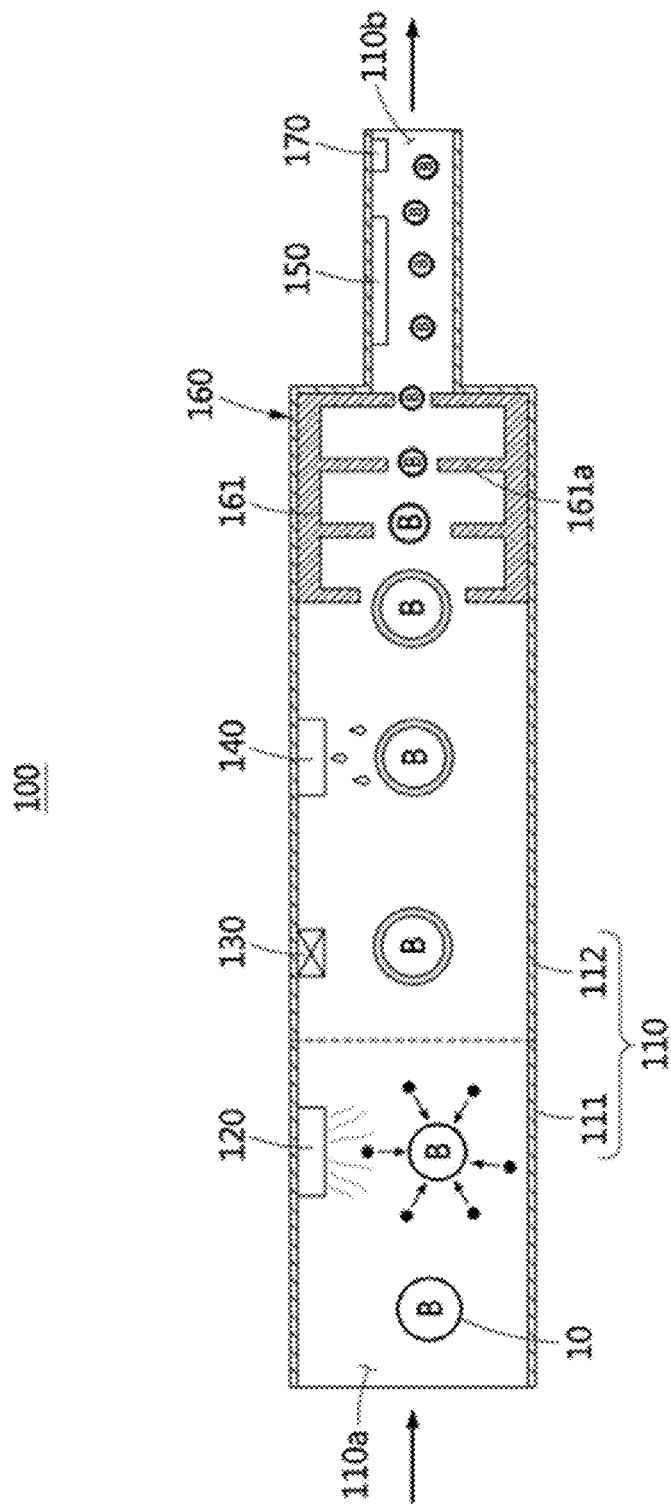
FIG. 1 illustrates the configuration of an apparatus for real-time continuous measurement of airborne microorganisms according to one embodiment of the present invention.

Hereinafter, an apparatus for real-time continuous measurement of airborne microorganisms according to a preferred embodiment will be described in detail with reference to the accompanying drawings. In this specification, the same or similar elements are designated by the same reference numerals. In addition, in the following description of the present invention, a detailed description of known functions and configurations incorporated herein will be omitted when it may make the subject matter of the present invention unclear. The embodiments of the present invention are provided to more fully describe the present invention to those skilled in the art. Therefore, the shapes and sizes of elements in the drawings may be exaggerated for clearer explanation.

FIG. 1 illustrates the configuration of an apparatus for real-time continuous measurement of airborne microorganisms according to one embodiment of the present invention.

As shown in FIG. 1, an apparatus 100 for real-time continuous measurement of airborne microorganisms includes a body unit 110, a vaporization unit 120, a liquefaction unit 130, a coating unit 140, and a measurement unit 150. The apparatus 100 for real-time continuous measurement of airborne microorganisms may continuously measure the concentration of airborne microorganisms 10, such as viruses, bacteria, and biological aerosols, existing in the air in real time. The apparatus 100 for real-time continuous measurement of airborne microorganisms may be applied to air cleaners and the bacteria detection sensors of sterilizers.

The body unit 110 may have an inlet 110a through which the airborne microorganisms 10 are introduced and an outlet 110b through which the airborne microorganisms 10 are discharged. The inside of the body unit 110 may be formed in a pipe shape provided with a passage through which the airborne microorganisms 10 move. The body unit 110 may be formed as a single body, or may be formed by interconnecting a plurality of pipes.

A suction pump 170 for controlling movement of the airborne microorganisms 10 may be installed at the outlet 110b of the body unit 110. Due to such a configuration in which the suction pump 170 is installed at the outlet 110b of the body unit 110, the airborne microorganisms 10 may move from the inlet 110a to the outlet 110b.

The vaporization unit 120 may vaporize a lysis solution and supply the lysis solution to the body unit 110. The vaporization unit 120 may be installed inside or outside the inlet 110a of the body unit 110, and may include a carburetor for vaporizing a lysis solution. The carburetor may convert a lysis solution into fine particles, mix the fine particles with the air, and discharge the fine particles in a vapor phase.

As a vaporized lysis solution is supplied from the vaporization unit 120, the surfaces of the airborne microorganisms 10 passing through the inside of the body unit 110 are coated with the lysis solution, and the airborne microorganisms 10 coated with the lysis solution are lysed, releasing adenosine triphosphate (ATP), DNA, RNA, and the like from the airborne microorganisms 10. That is, the cell walls of the airborne microorganisms 10 are damaged by the lysis solution, so that ATP, DNA, and RNA present inside the airborne microorganisms 10 are exposed to the outside. Here, lysing a microorganism does not mean dissolving the microorganism to make the microorganism liquid, but decomposing the microorganism into a number of elements.

In addition, the lysis solution discharged from the vaporization unit 120 may include a lysis buffer for extracting adenosine triphosphate (ATP) by lysing the cells of the airborne microorganisms 10. Specifically, the lysis buffer may be formed of an alcohol. Alcohols are inexpensive and may be easily purchased, and the properties thereof do not change when vaporized.

The liquefaction unit 130 may cool a vaporized lysis solution and condense the vaporized lysis solution on the surfaces of the airborne microorganisms 10. As the lysis solution is cooled by the liquefaction unit 130 and condensed on the surfaces of the airborne microorganisms 10, the contact area between the lysis solution and the airborne microorganisms 10 increases, thereby increasing the dissolution rate of the airborne microorganisms 10. That is, when a lysis solution changes from a vapor phase to a liquid phase by the liquefaction unit 130, the surface area of the airborne microorganisms 10 in contact with the lysis solution increases, and thus the wettability of the airborne microorganisms 10 increases. Accordingly, compared to the vapor-phase lysis solution, the amount of the liquid-phase lysis solution brought into contact with the airborne microorganisms 10 increases.

The liquefaction unit 130 may include a cooling module for reducing the ambient temperature. The cooling module may be implemented in various forms such as a cooling fan, cooling water, and a cooling fin. When the liquefaction unit 130 includes the cooling module, there is inevitably a temperature difference between the liquefaction unit 130 and the vaporization unit 120. Accordingly, the liquefaction unit 130 and the vaporization unit 120 may be disposed in different spaces. For example, the body unit 110 may be formed to be divided into a first body unit 111 and a second body unit 112. Then, the liquefaction unit 130 may be installed in the first body unit 111, and the vaporization unit 120 may be installed in the second body unit 112.

The coating unit 140 may apply a light-emitting agent onto the airborne microorganisms 10 lysed by a lysis solution. Specifically, the coating unit 140 may include a nozzle for spraying a light-emitting agent stored therein in the form of fine particles.

The light-emitting agent sprayed from the coating unit 140 may include substances, e.g., a luciferin and a luciferase, that generate light by reacting with ATP extracted from the airborne microorganisms 10. In addition, the light-emitting agent may further include magnesium ions ($Mg^{2+}$).

As the light-emitting agent is applied to the surfaces of the airborne microorganisms 10 by the coating unit 140, ATP extracted from the airborne microorganisms 10 reacts with the light-emitting agent to generate light. At this time, since the lysis solution is condensed on the surfaces of the airborne microorganisms 10 and the surface area of the airborne microorganisms 10 in contact with the lysis solution increases, the probability of the light-emitting agent coming into contact with the surfaces of the airborne microorganisms 10 increases, and thus adhesion of the light-emitting agent to the surfaces of the airborne microorganisms 10 may be promoted.

Meanwhile, the process of generating light by reacting ATP and the light-emitting agent is well known in the art, and thus a detailed description thereof will be omitted.

The measurement unit 150 may detect the intensity of light generated by reacting the airborne microorganisms 10 and the light-emitting agent and may measure the concentration of the airborne microorganisms 10. That is, as the concentration of the airborne microorganisms 10 increases, the amount of ATP extracted from the airborne microorganisms 10 increases and the intensity of light generated by reaction increases. That is, the measurement unit 150 may measure the concentration of the airborne microorganisms 10 by measuring light intensity. In this case, the intensity of light detected by the measurement unit 150 may be finally converted into information about the concentration of the airborne microorganisms 10 through signal processing. In addition, although not shown, the measurement unit 150 may include a display unit for displaying the concentration of the airborne microorganisms 10 in real time.

The measurement unit 150 may include a photomultiplier tube (PMT) sensor for receiving and measuring light generated by microorganisms. Since the PMT sensor is a high-sensitivity near-infrared sensor capable of measuring light of weak intensity, the concentration of microorganisms may be more accurately measured when using the PMT sensor. In addition, any device capable of measuring the concentration of microorganisms by detecting light, such as a photodiode (PD) and an avalanche photodiode (APD), may be applied to the measurement unit 150.

The apparatus 100 for real-time continuous measurement of airborne microorganisms may further include a concentrating unit 160.

The concentrating unit 160 is responsible for concentrating the airborne microorganisms 10 to reduce the volume thereof, and may be installed between the coating unit 140 and the measurement unit 150. As the airborne microorganisms 10 are concentrated by the concentrating unit 160, a larger amount of the airborne microorganisms 10 may be stored in a limited space, thereby reducing the overall size of the apparatus 100.

The concentrating unit 160 may include an aerodynamic lens 161 for forming a laminar flow by reducing the volume of the airborne microorganisms 10 stepwise. As shown in FIG. 1, the aerodynamic lens 161 may be disposed within the body unit 110 or may be formed in a pipe shape to connect a pair of body units.

For example, the aerodynamic lens 161 may include a plurality of lens portions 161a, and a lens hole through which the airborne microorganisms 10 pass may be formed be in the center between the lens portions 161a. In this case, the hole formed in the lens portions 161a may be formed to gradually narrow in the moving direction of the airborne microorganisms 10. Accordingly, whenever the airborne microorganisms 10 pass through one lens portion 161a, the volume of the airborne microorganisms 10 is reduced stepwise. As a result, a laminar flow is formed, and the airborne microorganisms 10 may be discharged in a row. At this time, to prevent separation of the airborne microorganisms 10 by preventing occurrence of differential pressure, the volume of the airborne microorganisms 10 is not reduced at once, but is gradually reduced. In addition, to induce the concentrated airborne microorganisms 10 to flow in a row, the width of the discharge part of the concentrating unit 160, i.e., the width of the body unit 110 at which the measurement unit 150 is located, may be formed narrower than the width of the body unit 110 at which the concentrating unit 160 is located.

As described above, the apparatus 100 for real-time continuous measurement of airborne microorganisms may perform a series of processes including sampling of the airborne microorganisms 10, ATP extraction, bioluminescence, and concentration measurement, and thus may perform real-time continuous measurement of the airborne microorganisms 10.

In addition, since the airborne microorganisms 10 moving in a gas phase are measured in real time, a separate collection device for collecting the airborne microorganisms 10 is not required, and thus wastewater is not generated from the collection device, thereby preventing environmental pollution.

In addition, since the airborne microorganisms 10 are not collected by a collection device, there is no measurement error due to contamination of the collection device.

In addition, since a series of processes from sampling of the airborne microorganisms 10 to measurement of the airborne microorganisms 10 is performed continuously, no extra time is required to collect and concentrate the airborne microorganisms 10, thereby reducing measurement time.

In addition, by vaporizing a lysis solution for destroying the cell walls of the airborne microorganisms 10 to discharge the lysis solution in a vapor phase and then cooling the lysis solution to condense the lysis solution on the surfaces of the airborne microorganisms 10, the contact area between the lysis solution and the airborne microorganisms 10 may be increased. Accordingly, the rate of lysing the airborne microorganisms 10 may be increased, thereby increasing the ATP extraction rate at which light is emitted by reaction with a light-emitting agent. Thus, time required to measure the concentration of the airborne microorganisms 10 may be reduced.

In addition, as a lysis solution is condensed on the surfaces of the airborne microorganisms 10, the surface area of the airborne microorganisms 10 increases. Accordingly, adhesion of a light-emitting agent to the surfaces of the airborne microorganisms 10 may be promoted, thereby increasing measurement accuracy.

In addition, the concentrating unit 160 is installed between the coating unit 140 and the measurement unit 150 to reduce the volume of the airborne microorganisms 10 stepwise and to discharge the airborne microorganisms 10 in a row by forming a laminar flow. Thus, during measurement, overlapping of the airborne microorganisms 10 may be prevented, thereby increasing accuracy when measuring the concentration of the airborne microorganisms 10.

Figure 2:
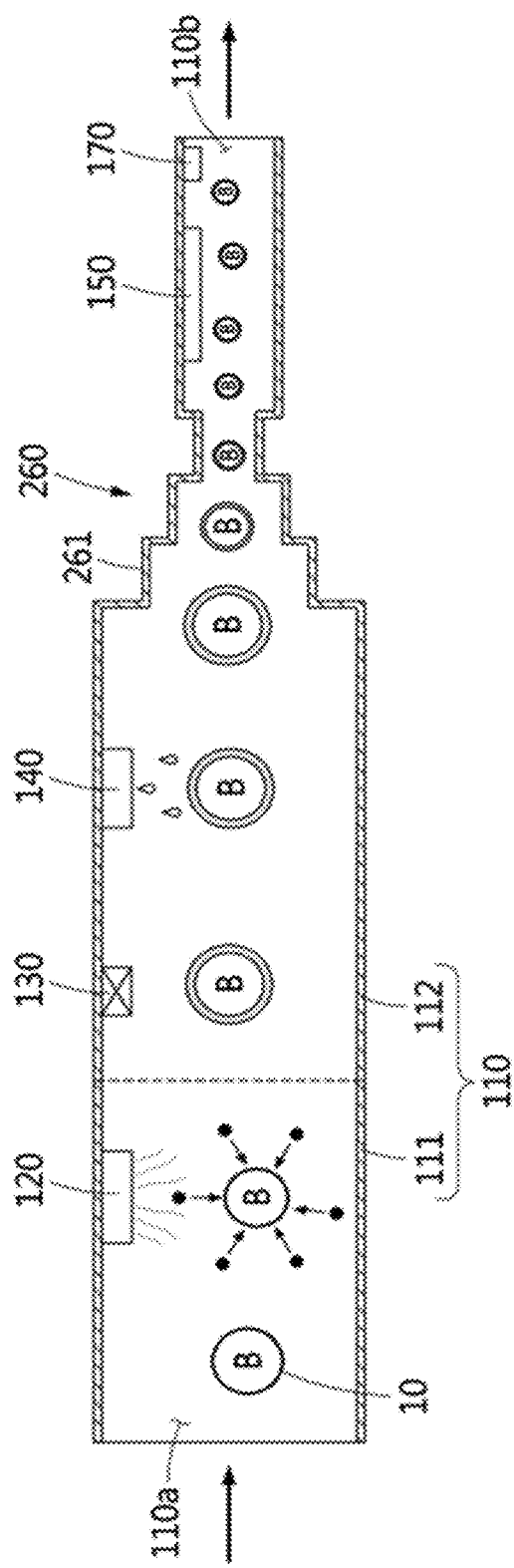
FIG. 2 illustrates an apparatus for real-time continuous measurement of airborne microorganisms according to another embodiment, characterized in that the apparatus of FIG. 2 has a different type of concentrating unit than the concentrating unit shown in FIG. 1.

FIG. 2 illustrates an apparatus for real-time continuous measurement of airborne microorganisms according to another embodiment, characterized in that the apparatus of FIG. 2 has a different type of concentrating unit than the concentrating unit shown in FIG. 1. In this embodiment, differences from the above-described embodiment are mainly described.

As shown in FIG. 2, a concentrating unit 260 may be provided by forming the body unit 110 so that the diameter of the body unit 110 is reduced stepwise. That is, the concentrating unit 260 may be provided by forming the body unit 110 so that the diameter of the body unit 110 located between a coating unit and the measurement unit 150 is gradually reduced. Accordingly, a plurality of steps 261 is formed in the body unit 110. As the airborne microorganisms 10 pass through the steps 261, the volume of the airborne microorganisms 10 is gradually reduced. The airborne microorganisms 10 passing through the steps 261 are arranged in a row and may pass through the outlet 110b of the body unit 110.

The present invention has been described with reference to the embodiments shown in the accompanying drawings, but these embodiments are only exemplary. Those skilled in the art will appreciate that various modifications and other equivalent embodiments are possible. Therefore, the scope of protection of the present invention should be defined by the following claims.

The invention claimed is:

1. An apparatus for real-time continuous measurement of airborne microorganisms, comprising:
   a body unit having an inlet through which airborne microorganisms are introduced and an outlet through which airborne microorganisms are discharged;
   a vaporization unit for vaporizing a lysis solution and supplying the vaporized lysis solution to an inside of the body unit;
   a liquefaction unit for cooling the vaporized lysis solution to condense the vaporized lysis solution on surfaces of the airborne microorganisms;
   a coating unit for applying a light-emitting agent onto the airborne microorganisms lysed by the lysis solution; and
   a measurement unit for detecting an intensity of light generated by reacting the airborne microorganisms and the light-emitting agent, and measuring a concentration of the airborne microorganisms.

2. The apparatus according to claim 1, wherein the lysis solution comprises a lysis buffer for extracting adenosine triphosphate (ATP) by lysing cells of the airborne microorganisms.

3. The apparatus according to claim 2, wherein the lysis buffer comprises an alcohol.

4. The apparatus according to claim 1, wherein the light-emitting agent comprises a luciferin and a luciferase.

5. The apparatus according to claim 4, wherein the light-emitting agent further comprises magnesium ions ($Mg^{2+}$).

6. The apparatus according to claim 1, wherein the measurement unit comprises a photomultiplier tube (PMT) sensor.

7. The apparatus according to claim 1, wherein a concentrating unit for concentrating the airborne microorganisms to reduce a volume of the airborne microorganisms is installed between the coating unit and the measurement unit.

8. The apparatus according to claim 7, wherein the concentrating unit comprises an aerodynamic lens.

9. The apparatus according to claim 7, wherein the concentrating unit is provided by forming the body unit so that a diameter of the body unit is reduced stepwise.

10. The apparatus according to claim 1, wherein a suction pump for controlling movement of the airborne microorganisms is installed at the outlet of the body unit.

11. An apparatus for real-time continuous measurement of airborne microorganisms, comprising:
- a body unit having an inlet through which airborne microorganisms are introduced and an outlet through which airborne microorganisms are discharged;
- a vaporization unit for vaporizing a lysis solution and supplying the vaporized lysis solution to an inside of the body unit;
- a liquefaction unit for cooling the vaporized lysis solution to condense the vaporized lysis solution on surfaces of the airborne microorganisms;
- a coating unit for applying an adenosine triphosphate ATP reactive light-emitting agent onto the airborne microorganisms lysed by the lysis solution;
- a concentrating unit for concentrating the airborne microorganisms coated with the ATP reactive light-emitting agent to reduce a volume of the airborne microorganisms; and
- a measurement unit for detecting an intensity of light generated by reacting the concentrated airborne microorganisms and the ATP reactive light-emitting agent, and measuring a concentration of the airborne microorganisms.

12. The apparatus according to claim 11, wherein the lysis solution comprises a lysis buffer for extracting adenosine triphosphate (ATP) by lysing cells of the airborne microorganisms.

13. The apparatus according to claim 12, wherein the lysis buffer comprises an alcohol.

14. The apparatus according to claim 11, wherein the ATP reactive light-emitting agent comprises a luciferin and a luciferase.

15. The apparatus according to claim 14, wherein the ATP reactive light-emitting agent further comprises magnesium ions ($Mg^{2+}$).

16. The apparatus according to claim 11, wherein the measurement unit comprises a photomultiplier tube (PMT) sensor.

17. The apparatus according to claim 11, wherein the concentrating unit comprises an aerodynamic lens.

18. The apparatus according to claim 11, wherein the concentrating unit is provided by forming the body unit so that a diameter of the body unit is reduced stepwise.

19. The apparatus according to claim 11, wherein a suction pump for controlling movement of the airborne microorganisms is installed at the outlet of the body unit.

* * * * *